(12) United States Patent
Bidarvatan et al.

(10) Patent No.: US 10,640,062 B2
(45) Date of Patent: May 5, 2020

(54) INTELLIGENT POWER MANAGEMENT FOR A VEHICLE

(71) Applicant: KARMA AUTOMOTIVE, LLC, Irvine, CA (US)

(72) Inventors: Mehran Bidarvatan, Irvine, CA (US); Thomas Gacka, Huntington Beach, CA (US)

(73) Assignee: KARMA AUTOMOTIVE LLC, Irvine, CA (US)

( * ) Notice: Subject to any disclaimer, the term of this patent is extended or adjusted under 35 U.S.C. 154(b) by 167 days.

(21) Appl. No.: 15/975,555

(22) Filed: May 9, 2018

(65) Prior Publication Data

US 2019/0344734 A1   Nov. 14, 2019

(51) Int. Cl.
*B60R 16/023*   (2006.01)

(52) U.S. Cl.
CPC ...... *B60R 16/0236* (2013.01); *B60R 16/0232* (2013.01)

(58) Field of Classification Search
CPC .......................... B60R 16/0236; B60R 16/0232
USPC .......................................................... 701/23
See application file for complete search history.

(56) References Cited

U.S. PATENT DOCUMENTS

| 6,408,968 B1* | 6/2002 | Wakashiro | B60K 6/485 180/65.26 |
|---|---|---|---|
| 2010/0262343 A1* | 10/2010 | Eriksson | B60W 10/06 701/54 |
| 2015/0242799 A1* | 8/2015 | Seki | G06Q 10/063114 705/7.15 |
| 2017/0356381 A1* | 12/2017 | Richards | F02D 41/3094 |

* cited by examiner

*Primary Examiner* — Muhammad Shafi
(74) *Attorney, Agent, or Firm* — Gordon & Rees LLP (57) ABSTRACT

A system for intelligent power management for a vehicle includes a fuel efficiency sensor, a dynamometer, an noise, vibration, and/or harshness (NVH) sensor, and a measurement unit & map generator. The fuel efficiency sensor measures fuel efficiencies of the vehicle. The dynamometer senses torques and revolutions per minute (RPMs) of an internal combustion engine (ICE). The NVH sensor measures NVH level, for example noise and/or vibration levels, of the vehicle. The measurement unit & map generator produces an efficiency map including a plurality of fuel efficiency contours, a plurality of NVH level lines, and a plurality of power level curves. The efficiency map includes at least one vehicle operation point that corresponds to an acceptable NVH level and/or a desirable fuel efficiency, and that represents a desirable torque and a desirable RPM of the ICE.

20 Claims, 9 Drawing Sheets

Measured Fuel Efficiencies

| Engine Speed | Engine Torque | Fuel Efficiency |
|---|---|---|
| RPM 3 | Trq 3 | BSFC 2 |
| RPM 4 | Trq 4 | BSFC 1 |
| RPM 8 | Trq 5 | BSFC 3 |

Measured NVH Levels

| Engine Speed | Engine Torque | NVH Level |
|---|---|---|
| RPM 3 | Trq 3 | NVH 11 |
| RPM 4 | Trq 4 | NVH 13 |
| RPM 8 | Trq 5 | NVH 20 |

Measured Power Levels

| Engine Speed | Engine Torque | Power Level |
|---|---|---|
| RPM 3 | Trq 3 | Level 4 |
| RPM 4 | Trq 4 | Level 6 |
| RPM 8 | Trq 5 | Level 12 |

INTELLIGENT POWER MANAGEMENT FOR A VEHICLE

RELATED APPLICATION

The present application is related to U.S. patent application Ser. No. 15/975,587, filed on May 9, 2018. The disclosure in this related application is hereby incorporated fully by reference into the present application.

BACKGROUND

Hybrid electric vehicles having dual power sources, such as a battery, and a chemical power source, such as an internal combustion engine (ICE), are increasingly used for improving energy efficiency and emissions. Many car manufacturers now manufacture at least one model of hybrid electric vehicle. Such hybrid electric vehicles may include intelligent power management systems capable of altering the torque or revolutions per minute (RPM) the ICE runs at. However, conventional intelligent power management systems are often reactive to the actual behavior of the hybrid electric vehicle, rather than predictive, and cannot easily account for other concerns besides driving the hybrid electric vehicle at the speed demanded by the driver.

SUMMARY

The present disclosure is directed to intelligent power management for a vehicle, substantially as shown in and/or described in connection with at least one of the figures, and as set forth in the claims.

DETAILED DESCRIPTION

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Figure 1:
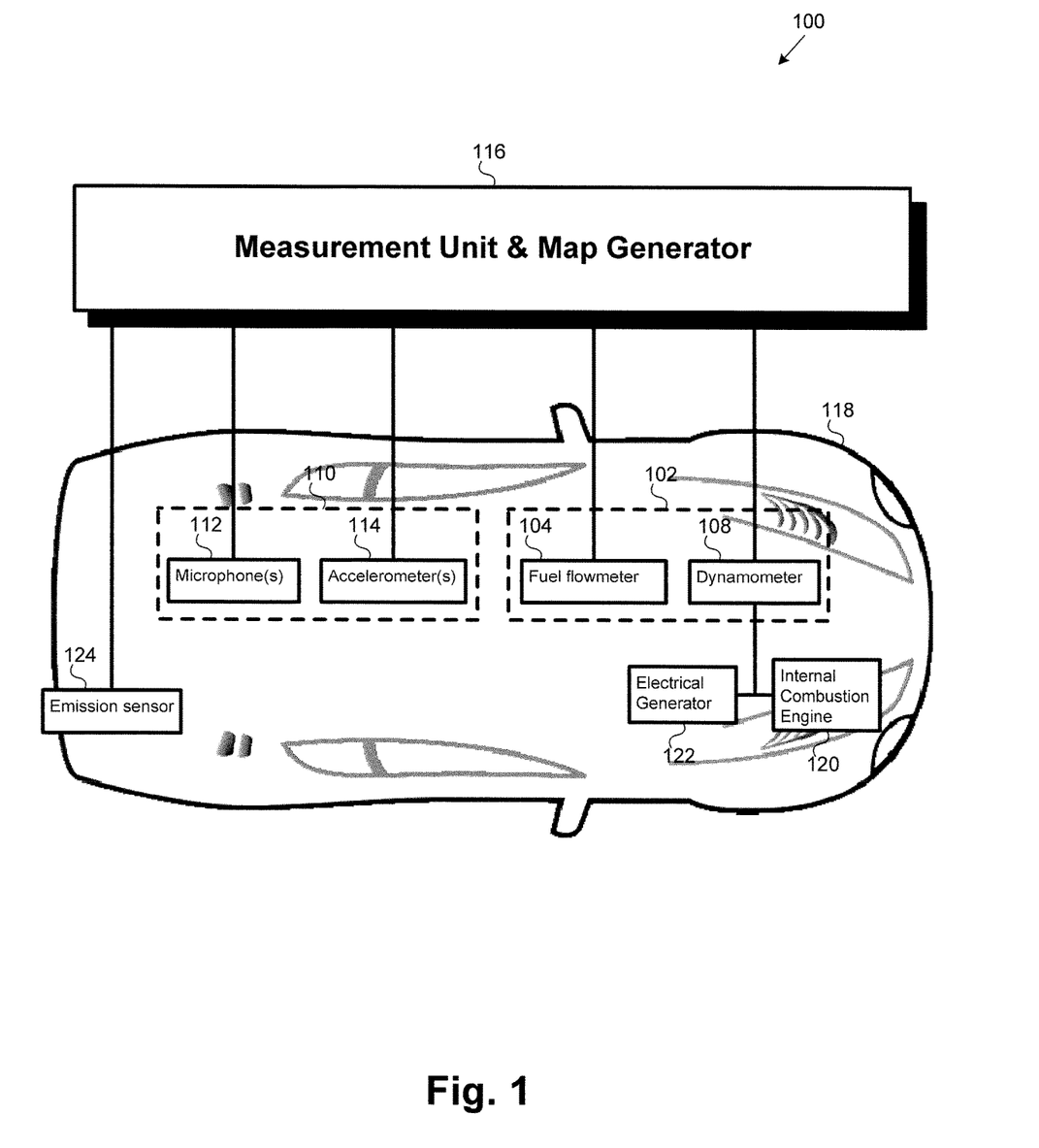
FIG. 1 illustrates a diagram of a portion of an exemplary intelligent power management system in a vehicle according to one implementation of the present application.

FIG. 1 illustrates a diagram of a portion of an exemplary intelligent power management system in a vehicle according to one implementation of the present application. As illustrated in FIG. 1, intelligent power management system 100 includes fuel efficiency sensor 102 including fuel flowmeter 104 and dynamometer 108; noise, vibration, and/or harshness (NVH) sensor 110 including microphone(s) 112 and accelerometer(s) 114; and measurement unit & map generator 116. FIG. 1 also shows vehicle 118 having internal combustion engine (ICE) 120 and electrical generator 122.

Intelligent power management system 100 measures various characteristics of vehicle 118 in operation. In one implementation, vehicle 118 is operated on a test bench by running ICE 120. Meanwhile, fuel efficiency sensor 102 of intelligent power management system 100 takes fuel efficiency measurements, and NVH sensor 110 takes NVH level measurements. Fuel efficiency sensor 102 and NVH sensor 110 pass these measurements to measurement unit & map generator 116. Measurement unit & map generator 116 produces an efficiency map that represents both the measured fuel efficiencies and the NVH levels, among other characteristics. As discussed below, the efficiency map can be used for intelligent power management of vehicle 118. In the present implementation, vehicle 118 is a hybrid electric car. However, in other implementations, vehicle 118 may be any other type of vehicle.

Fuel efficiency sensor 102 can measure fuel efficiencies of vehicle 118 using fuel flowmeter 104 and dynamometer 108. Within fuel efficiency sensor 102, fuel flowmeter 104 measures a fuel consumption rate for vehicle 118. Fuel flowmeter 104 measures an amount of fuel in vehicle 118 during time intervals while ICE 120 is running. In one implementation, fuel flowmeter 104 measures an amount of fuel in a fuel tank (not shown) of vehicle 118. Fuel flowmeter 104 may include, for example, a volumetric gauge, a gravity gauge, or any other type of gauge, integrated with a digital timer, a software timer, or any other type of timer. In another implementation, fuel flowmeter 104 may include distinct components, each coupled to measurement unit & map generator 116, and measurement unit & map generator 116 may correlate measurements from these components as a fuel consumption rate. In one implementation, additional flowmeters may be placed in, on, or near ICE 120 itself to provide additional points of measurement for the fuel consumption rate for ICE 120. In one implementation, additional flowmeters may be placed along fuel lines to account for losses in the fuel lines.

Within fuel efficiency sensor 102, dynamometer 108 measures a power produced by vehicle 118. In the present implementation, vehicle 118 has a series hybrid drivetrain, and electrical generator 122 is coupled to ICE 120. ICE 120 produces mechanical power and electrical generator 122 converts mechanical power into electrical power, which can then be used by an electric wheel motor or a battery (not shown) of vehicle 118. In the present implementation, dynamometer 108 is configured to measure both electrical power produced by electrical generator 120 and mechanical power produced by ICE 120.

Dynamometer 108 may include, for example, a high power rated multimeter or probe to measure electrical power produced by electrical generator 120. Dynamometer 108 may also include, for example, a motoring dynamometer (an AC motor or a DC motor that can operate as a motor that drives the unit under test or as a generator that is driven by the unit under test), an eddy current dynamometer (an electrically conductive core, shaft, or disc moving across a magnetic field producing resistance), or a water brake dynamometer (draining and filling a housing with a controlled amount of water producing resistance), to measure mechanical power produced by ICE 120. In one implementation, vehicle 118 may have a parallel hybrid drivetrain. In one implementation, vehicle 118 may have a purely mechanically powered drivetrain, and omit electrical generator 122.

Fuel efficiency sensor 102 can measure fuel efficiencies of vehicle 118 using fuel flowmeter 104 and dynamometer 108. As illustrated in FIG. 1, dynamometer 108 is coupled to measurement unit & map generator 116. Measurement unit & map generator 116 receives the measured produced power, and correlates it with the fuel consumption rate as a fuel efficiency measurement. In the present implementation, the fuel efficiency measurement is a brake specific fuel consumption (BSFC), i.e., it is the rate of fuel consumption divided by the power produced. BSFC can be measured in grams per kilowatt-hour (g/kWh). Lower BSFC values correspond to better fuel economy of ICE 120.

NVH sensor 110 can measure NVH levels of vehicle 118 using microphone(s) 112 and/or accelerometer(s) 114. As used in the present application, an NVH level measurement refers to any combination of noise measurements, and/or vibration measurements, and/or any other subject measure of harshness. For example, an NVH level measurement may be a weighted product of a noise measurement from microphone(s) 112 and a vibration measurement from accelerometer(s) 114. An NVH level may include a decibel (dB) measurement. Lower NVH values may correspond to lower noise levels of ICE 120 in FIG. 1.

Microphone(s) 112 measure noise while ICE 120 is running. Microphone(s) 112 may be, for example, a discrete microphone or a microphone array. Microphone(s) 112 may be positioned on or near any part of vehicle 118 where noise is a concern. In one implementation, microphone(s) 112 may be positioned in a passenger cabin of vehicle 118, and measure noise in the passenger cabin. In another implementation, microphone(s) 112 may be positioned on or near ICE 120, and measure noise on or near ICE 120. In yet another implementation, microphone(s) 112 may be positioned both in a passenger cabin of vehicle 118 and on or near ICE 120, and measure a noise difference between the passenger cabin and ICE 120. The noise difference measurement may be useful for evaluating noise dampening properties of the passenger cabin.

Accelerometer(s) 114 measure vibration while ICE 120 is running. Accelerometer(s) 114 may be, for example, microelectromechanical systems (MEMS) accelerometers, such as, for example, capacitive accelerometers, piezoresistive accelerometers, or piezoelectric accelerometers. Accelerometer(s) 114 may be, for example, a discrete accelerometer or an accelerometer array. Accelerometer(s) 114 may be positioned in a passenger cabin of vehicle 118, on or near ICE 120, or on or near any other part of vehicle 118 where vibration is a concern.

Measurement unit & map generator 116 can measure emission outputs of vehicle 118 using emission sensor 124. As used in the present application, an emission output refers to emission of any particle from vehicle 118. For example, an emission measurement can measure a $CO_2$ emission output in grams per kilowatt-hour (g/kWh). Lower values may correspond to lower emission outputs of ICE 120 in FIG. 1.

Emission sensor 124 measures emission outputs while ICE 120 is running. Emission sensor 124 may include, for example, an oxygen sensor. Emission sensor 124 may be positioned on or near any part of vehicle 118 where emission outputs are a concern. In one implementation, emission sensor 124 may be positioned in an exhaust chamber or exhaust pipe of vehicle 118.

In vehicle intelligent power management system 100, fuel efficiency sensor 102 and NVH sensor 110 perform numerous measurements corresponding to different tested combinations of torques and revolutions per minute (RPMs) of ICE 120. ICE 120 can be tested in a variety of ways to achieve numerous combinations. In one implementation, a sweep test may be performed, where ICE 120 is allowed to accelerate from a specified starting RPM to a specified ending RPM. Multiple sweep tests may be performed, each with different accelerations. In another implementation, a steady-state test may be performed, where ICE 120 is held at a specified torque or RPM for a specified period of time. Multiple steady-state tests may be performed, each with different torques or RPMs. A transient or cyclical test may be performed, where the speed of ICE 120 is varied for various applied loads. Performing the various tests will run ICE 120 at numerous combinations of torques and RPMs. For each combination, fuel efficiency sensor 102 measures a fuel efficiency and NVH sensor 110 measures a NVH level of vehicle 118. For each combination, dynamometer 108 also measures the corresponding torque and the corresponding RPM of ICE 120.

The various measurements may be passed to measurement unit & map generator 116 and stored when the measurements are taken. Alternatively, measurements may be stored in respective sensors and later passed to measurement unit & map generator 116. Measurements from sensors may be digital or analog outputs, and can be passed wirelessly or over a wired connection. As discussed below, measurement unit & map generator 116 produces an efficiency map that represents both the measured fuel efficiencies and the NVH levels, among other measurements. The efficiency map can be produced using a computer programming/simulation environment.

Figure 2A:
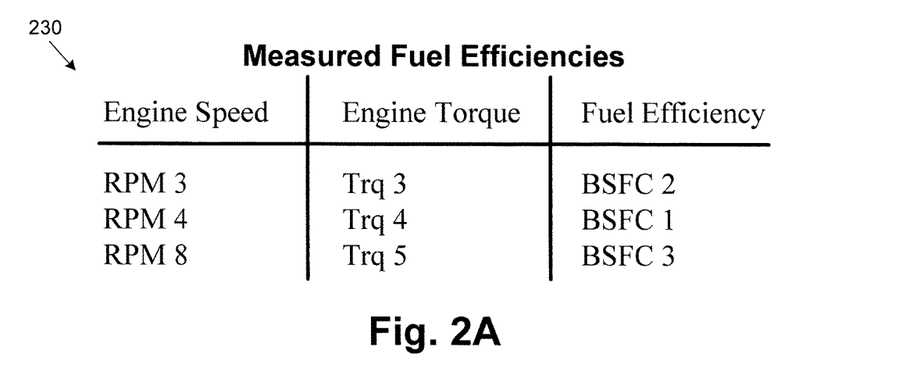
FIG. 2A illustrates a portion of an exemplary table of measured fuel efficiencies according to one implementation of the present application.

FIG. 2A illustrates a portion of an exemplary table of measured fuel efficiencies according to one implementation of the present application. In FIG. 2A, table 230 shows exemplary fuel efficiencies for different tested combinations of torques and RPMs. For the purpose of an example only, a fuel efficiency corresponding to RPM 3 and Trq 3 is shown by the corresponding row in table 230 by table entry BSFC 2. As another example, a fuel efficiency corresponding to RPM 4 and Trq 4 is shown by the corresponding row in table 230 by table entry BSFC 1. As yet another example, a fuel efficiency corresponding to RPM 8 and Trq 5 is shown by the corresponding row in table 230 by table entry BSFC 3. Measurement unit & map generator 116 uses the fuel efficiency values to produce representative fuel efficiency contours.

Figure 2B:
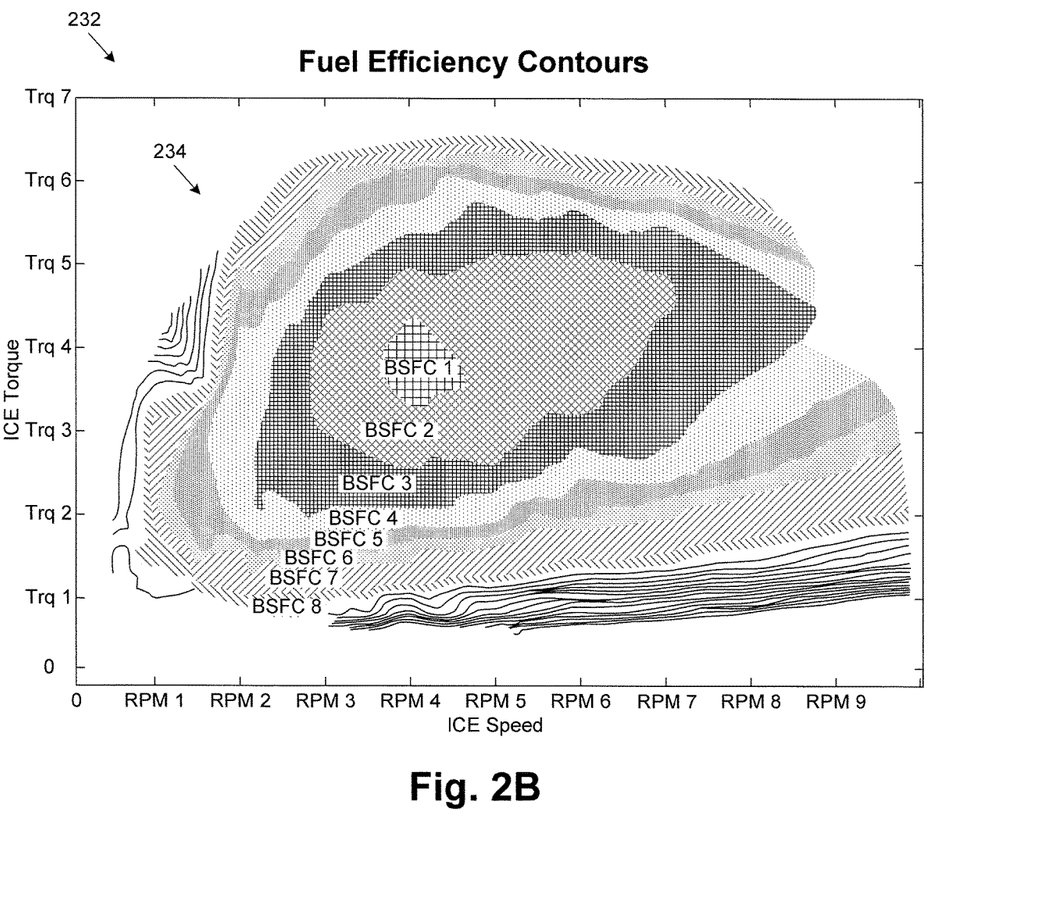
FIG. 2B illustrates a portion of an exemplary fuel efficiency map according to one implementation of the present application.

FIG. 2B illustrates a portion of an exemplary efficiency map with fuel efficiency contours according to one implementation of the present application. As illustrated in FIG. 2B, exemplary fuel efficiency map 232 includes fuel efficiency contours 234. Each fuel efficiency contour's region is shown by a unique cross-hatching in addition to being identified by a corresponding BSFC value.

A fuel efficiency contour represents combinations of torques and RPMs of ICE 120 at which vehicle 118 has same or similar fuel efficiencies. Measurement unit & map generator 116 finds same or similar fuel efficiencies from the set of fuel efficiencies measured by fuel efficiency sensor 102, and finds the corresponding torques and RPMs measured by dynamometer 108, resulting in the entries such as those shown in table 230 of FIG. 2A, as well as many more entries that are not shown in exemplary table 230, but are used to produce the regions encompassed by fuel efficiency contours 234 in efficiency map 232. That is to say that measurement unit & map generator 116 produces fuel efficiency contours 234 shown in efficiency map 232 based on numerous measured values, a small sample of which are shown in exemplary table 230 to preserve brevity.

Efficiency map 232 in FIG. 2B shows fuel efficiency contours 234 with fuel efficiencies of BSFC 1 up to BSFC 8. BSFC values shown in FIG. 2B are merely examples and are not intended to correspond to actual numerical values. In some implementations, efficiency map 232 may have fuel efficiency contours 234 with different ranges and increments. The shapes of fuel efficiency contours 234 will generally vary between different vehicles. Even though the torques and RPMs of fuel efficiency contours 234 are based on ICE 120, because vehicle 118 has a series hybrid drivetrain in the present implementation, the fuel efficiencies of fuel efficiency contours 234 are based on the power produced by electrical generator 122, which directly corresponds to the torque and RPM of ICE 120. As such, efficiency map 232 accounts for losses in the drivetrain configuration.

Figure 3A:
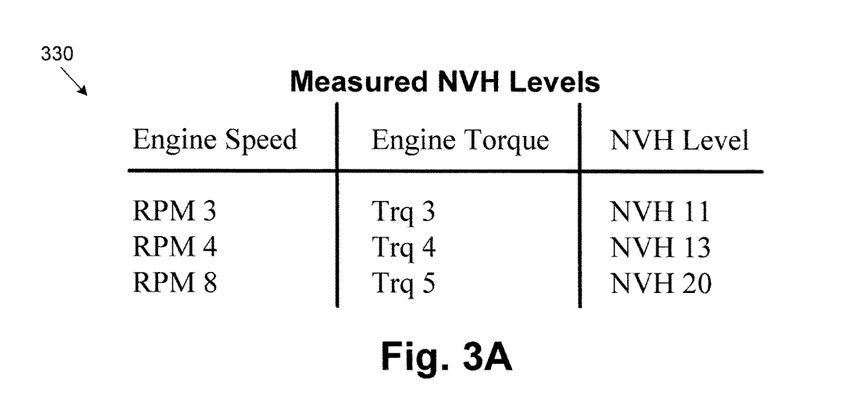
FIG. 3A illustrates a portion of an exemplary table of measured harshness levels according to one implementation of the present application.

FIG. 3A illustrates a portion of an exemplary table of measured NVH levels according to one implementation of the present application. In FIG. 3A, table 330 shows exemplary NVH levels for different tested combinations of torques and RPMs. For the purpose of an example only, a NVH level corresponding to RPM 3 and Trq 3 is shown by the corresponding row in table 330 by table entry NVH 11. As another example, a NVH level corresponding to RPM 4 and Trq 4 is shown by the corresponding row in table 330 by table entry NVH 13. As yet another example, a NVH level corresponding to RPM 8 and Trq 5 is shown by the corresponding row in table 330 by table entry NVH 20. Measurement unit & map generator 116 uses the NVH level values to produce representative NVH level lines.

Figure 3B:
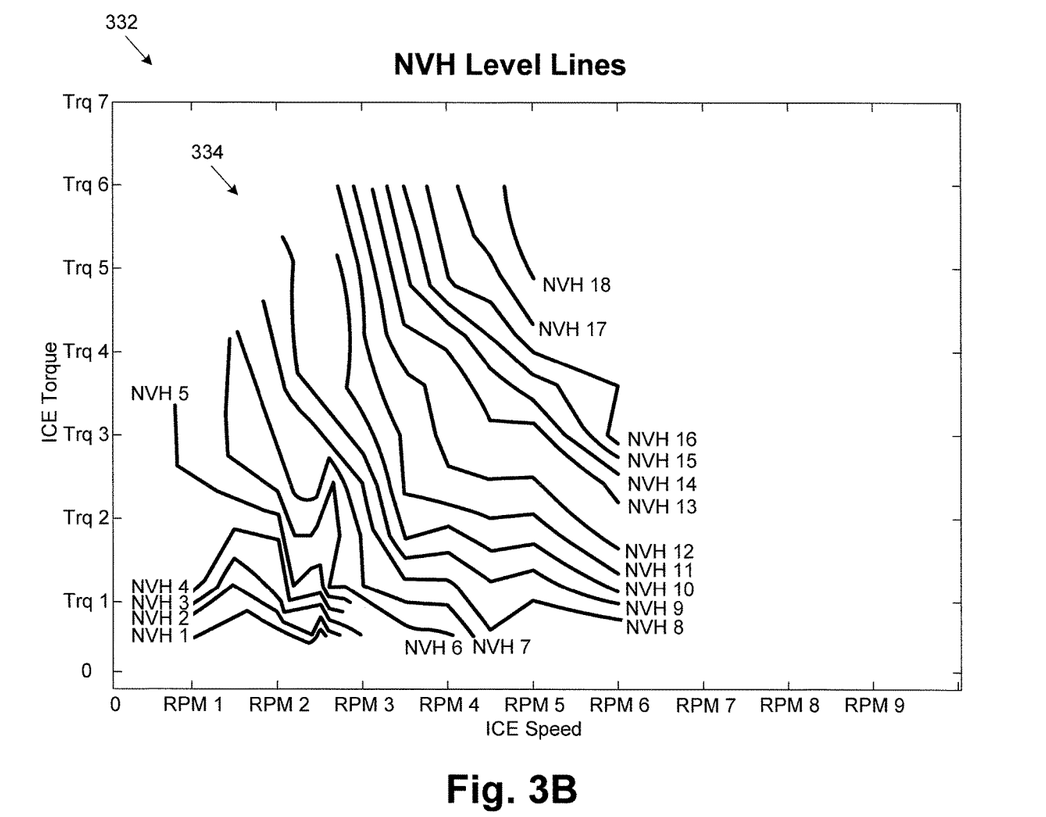
FIG. 3B illustrates a portion of an exemplary NVH level efficiency map according to one implementation of the present application.

FIG. 3B illustrates a portion of an exemplary efficiency map with NVH level lines according to one implementation of the present application. As illustrated in FIG. 3B, NVH level efficiency map 332 includes NVH level lines 334. An NVH level line represents combinations of torques and RPMs of ICE 120 at which vehicle 118 has same or similar NVH levels. Measurement unit & map generator 116 finds same or similar NVH levels from the set of NVH levels measured by NVH sensor 110, and finds the corresponding torques and RPMs measured by dynamometer 108, resulting in the entries such as those shown in table 330 of FIG. 3A, as well as many more entries that are not shown in exemplary table 330, but are used to produce NVH level lines 334 shown in efficiency map 332. That is to say that measurement unit & map generator 116 produces NVH level lines 334 shown in efficiency map 332 based on numerous measured values, a small sample of which are shown in exemplary table 330 to preserve brevity.

Efficiency map 332 in FIG. 3B shows NVH level lines 334 with NVH levels ranging from NVH 1 to NVH 18. NVH values shown in FIG. 3B are merely examples and are not intended to correspond to actual numerical values. In some implementations, efficiency map 332 may have NVH level lines 334 with different ranges and increments. The shapes of NVH level lines 334 will generally vary between different vehicles. Even though the torques and RPMs of NVH level lines 334 are based on ICE 120, the NVH levels of NVH level lines 334 may be based on the noise and/or vibration in a passenger cabin of vehicle 118. Thus, efficiency map 332 may account for dampening properties of the passenger cabin.

Figure 4A:
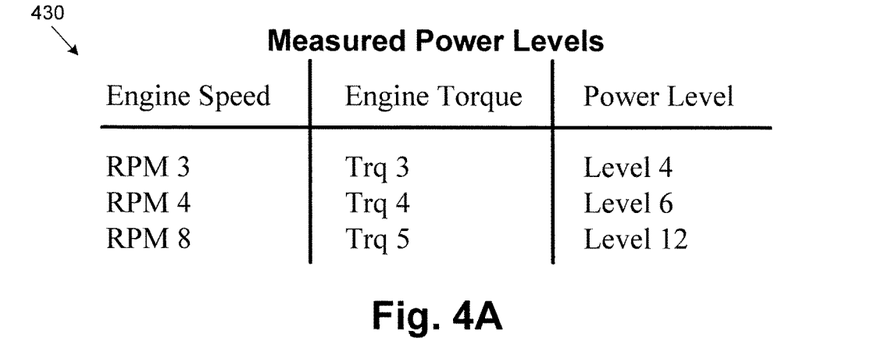
FIG. 4A illustrates a portion of an exemplary table of measured power levels according to one implementation of the present application.

FIG. 4A illustrates a portion of an exemplary table of measured power levels according to one implementation of the present application. In FIG. 4A, table 430 shows exemplary power levels for different tested combinations of torques and RPMs. For the purpose of an example only, a power level corresponding to RPM 3 and Trq 3 is shown by the corresponding row in table 430 by table entry Level 4. As another example, a power level corresponding to RPM 4 and Trq 4 is shown by the corresponding row in table 430 by table entry Level 6. As yet another example, an NVH level corresponding to RPM 8 and Trq 5 is shown by the corresponding row in table 430 by table entry Level 12. Measurement unit & map generator 116 can derive the power levels based on the torques and RPMs measured by dynamometer 108, according to equation (1) below:

$$\text{Power (kW)} = \text{Torque (Nm)} \times \text{Speed (RPM)} \div 9{,}548.8 \text{ (Nm} \times \text{RPM/kW)} \quad \text{Equation (1)}.$$

Measurement unit & map generator 116 uses the power level values to produce representative power level curves.

Figure 4B:
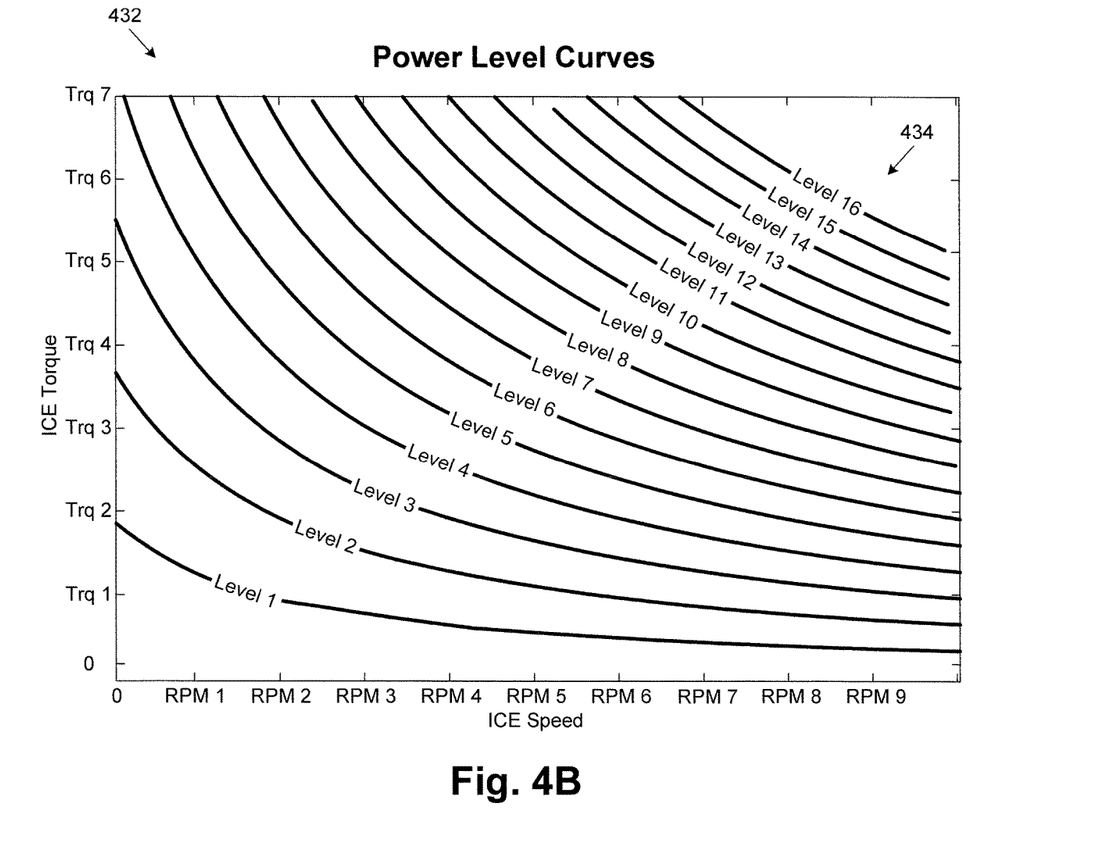
FIG. 4B illustrates a portion of an exemplary power level efficiency map according to one implementation of the present application.

FIG. 4B illustrates a portion of an exemplary efficiency map with power level curves according to one implementation of the present application. As illustrated in FIG. 4B, power level efficiency map 432 includes power level curves 434. A power level curve represents combinations of torques and RPMs of ICE 120 at which ICE 120 has same or similar power levels. Measurement unit & map generator 116 finds same or similar power levels from the set of power levels measured by dynamometer 108 based on torques and RPMs when ICE 120 is running, resulting in the entries such as those shown in table 430 of FIG. 4A, as well as many more entries that are not shown in exemplary table 430, but are used to produce power level curves 434 in efficiency map 432. That is to say that measurement unit & map generator 116 produces power level curves 434 shown in efficiency map 432 based on numerous measured values, a small sample of which are shown in exemplary table 430 to preserve brevity. Efficiency map 432 in FIG. 4B shows power level curves 434 with power levels ranging from Level 1 to Level 16. Power level values shown in FIG. 4B are merely examples and are not intended to correspond to actual numerical values. In some implementations, efficiency map 432 may have power level curves 434 with different ranges and increments. Thus, efficiency map 332 may account for operation of ICE 120 at fixed power levels.

Figure 5:
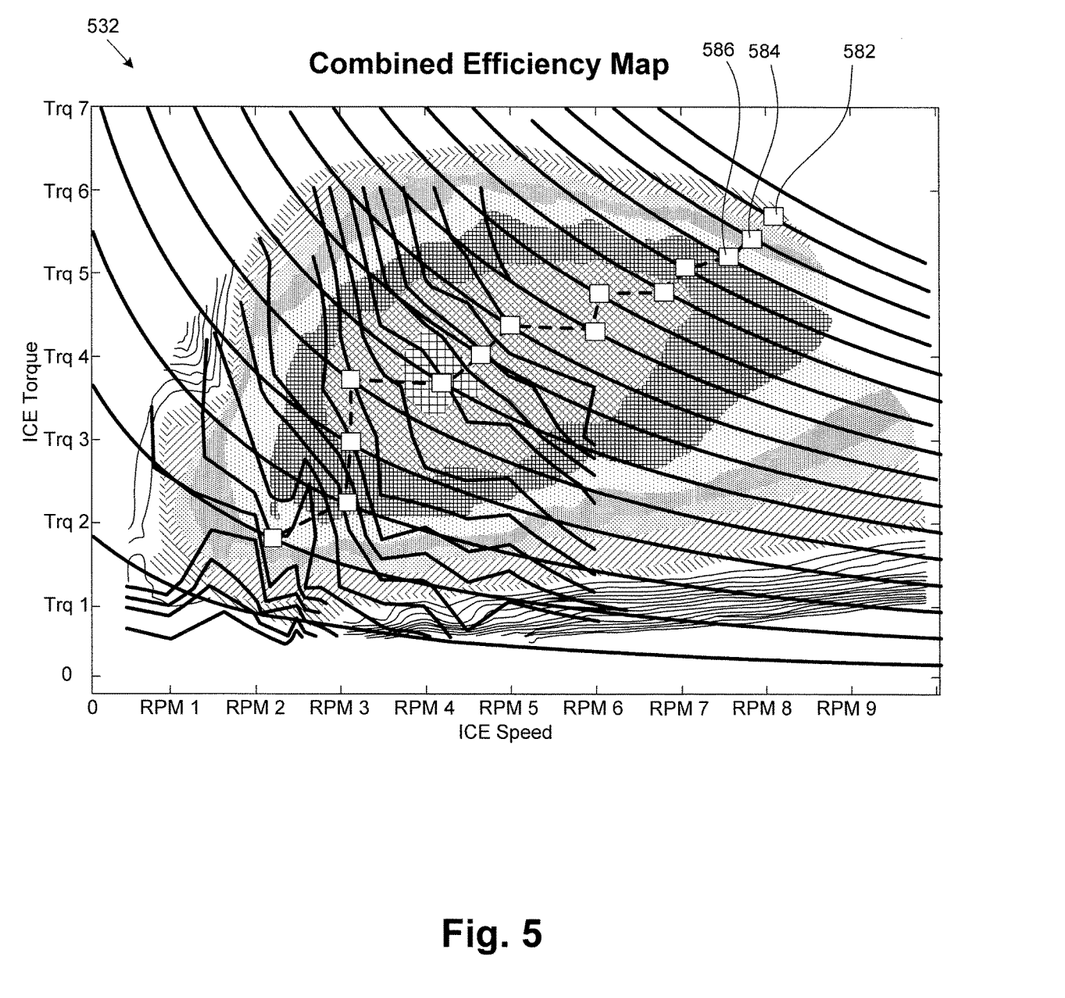
FIG. 5 illustrates a portion of an exemplary combined efficiency map according to one implementation of the present application.

FIG. 5 illustrates a portion of an exemplary combined efficiency map according to one implementation of the present application. As illustrated in FIG. 5, combined efficiency map 532 includes fuel efficiency contours 234, NVH level lines 334, and power level curves 434 by combining and incorporating fuel efficiency map 232, NVH level efficiency map 332, and power level efficiency map 432. Efficiency map 532 further includes vehicle operation points, indicated visually as squares, such as squares or vehicle operation points 582, 584, and 586, connected by dashed lines. As used in the present application, a vehicle operation point refers to a particular torque and RPM of ICE 120 that corresponds to an acceptable NVH level and/or a desired fuel efficiency of vehicle 118. The acceptable NVH level and the desired fuel efficiency of vehicle 118 are generally optimum values determined by measurement unit & map generator 116 according to given rules. In one implementation, measurement unit & map generator 116 determines that a desired fuel efficiency of vehicle 118 corresponds to a fuel efficiency contour with the lowest BSFC along a given power level curve or along a given NVH level line. In one implementation, measurement unit & map generator 116 determines that an acceptable NVH level of vehicle 118 corresponds to an NVH level line with the lowest noise along a given power level curve or along a given fuel efficiency contour.

In the present implementation, each vehicle operation point corresponds to both an acceptable NVH level and a desired fuel efficiency of vehicle 118. Referring to combined efficiency map 532 in FIG. 5, the portion of a given power level curve intersecting the fuel efficiency contour with the lowest BSFC along that power level curve is an intersection region. Measurement unit & map generator 116 determines that the intersection region has a desired fuel efficiency of vehicle 118. Next, measurement unit & map generator 116 determines that an acceptable NVH level of vehicle 118 corresponds to an NVH level line with the lowest noise along the intersection region. Measurement unit & map generator 116 determines that an intersection point of this NVH level line with the intersection region corresponds to both an acceptable NVH level and a desired fuel efficiency of vehicle 118, and thus, measurement unit & map generator 116 produces the intersection point as a vehicle operation point, such as any of the vehicle operation points 582, 584, and 586 in efficiency map 532.

In other implementations, vehicle operation points may corresponds to both an acceptable NVH level and a desired fuel efficiency of vehicle 118 in another manner. For example, measurement unit & map generator 116 may determine that an acceptable NVH level and a desired fuel efficiency of vehicle 118 correspond to an intersection of a NVH level line with the lowest noise along a given power level curve, so long as that intersection is within the three best fuel efficiency contours (for example, BSFC 1, BSFC 2, and BSFC 3 in FIG. 2B) along that power level curve. In one implementation, efficiency map 532 may include emission measurements in a manner similar to fuel efficiency contours 234, and vehicle operation points may correspond to desired emission outputs, in addition to both acceptable NVH levels and desired fuel efficiencies. In another implementation, as discussed below, measurement unit & map generator 116 may assign different weighting factors to fuel efficiency contours 234 and NVH level lines 334.

Vehicle operation points of efficiency map 532 represent a desirable torque and/or a desirable RPM of ICE 120. That is, when ICE 120 is run at a vehicle operation point, vehicle 118 will exhibit the acceptable NVH level and/or the desired fuel efficiency. With vehicle intelligent power management system 100 and efficiency map 532, an intelligent power management system for vehicle 118 can adapt ICE 120 to run at a desirable operating torques and RPMs in accordance with power level and driving demands. Because efficiency map 532 includes both fuel efficiency contours and NVH level lines, vehicle intelligent power management system 100 accommodates intelligently managing ICE 120 so as to balance power level and driving demands with acceptable NVH levels and desirable fuel efficiencies.

Intelligently managing ICE 120 with respect to both fuel efficiency and NVH has particular applicability for luxury hybrid vehicles, where convenience and comfort are both highly prioritized. Moreover, because measurement unit & map generator 116 can determine acceptable NVH levels and/or desirable fuel efficiencies based on a given power level curve, vehicle intelligent power management system 100 is useful with intelligent power management systems that run ICE 120 at discrete power levels. And when ICE 120 is run at continuous power levels, adjacent power level curves and corresponding adjacent vehicle operation points of efficiency map 532 can be used to interpolate another acceptable vehicle operation point. Additionally, because vehicle intelligent power management system 100 produces efficiency map 532, intelligent power management systems need not compute a desirable torque and/or a desirable RPM each time power level and driving demands change. Processing power and processing time can be reduced. And ICE 120 can adapt to a desirable torque and/or a desirable RPM faster, and account for NVH when doing so.

Figure 6A:
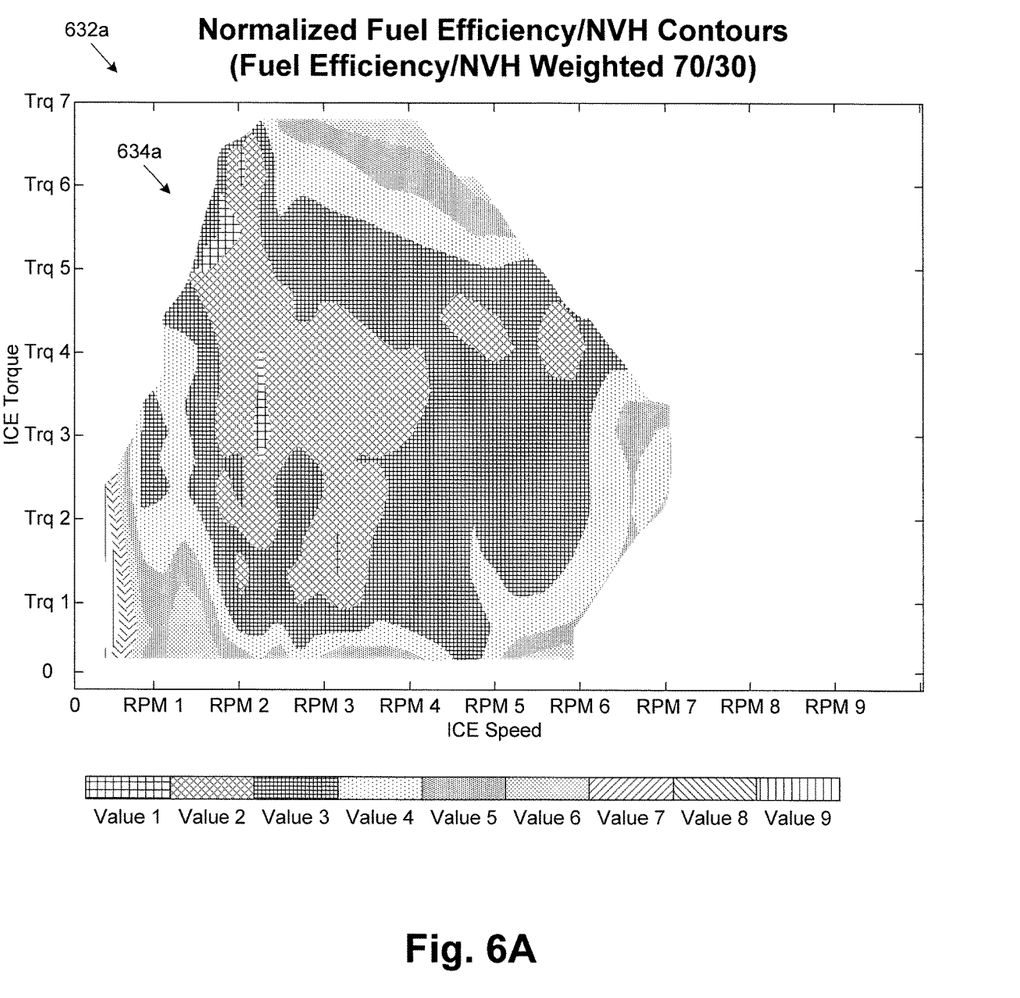
FIGS. 6A and 6B each illustrate a portion of an exemplary normalized fuel efficiency and NVH level map according to one implementation of the present application.
Figure 6B:
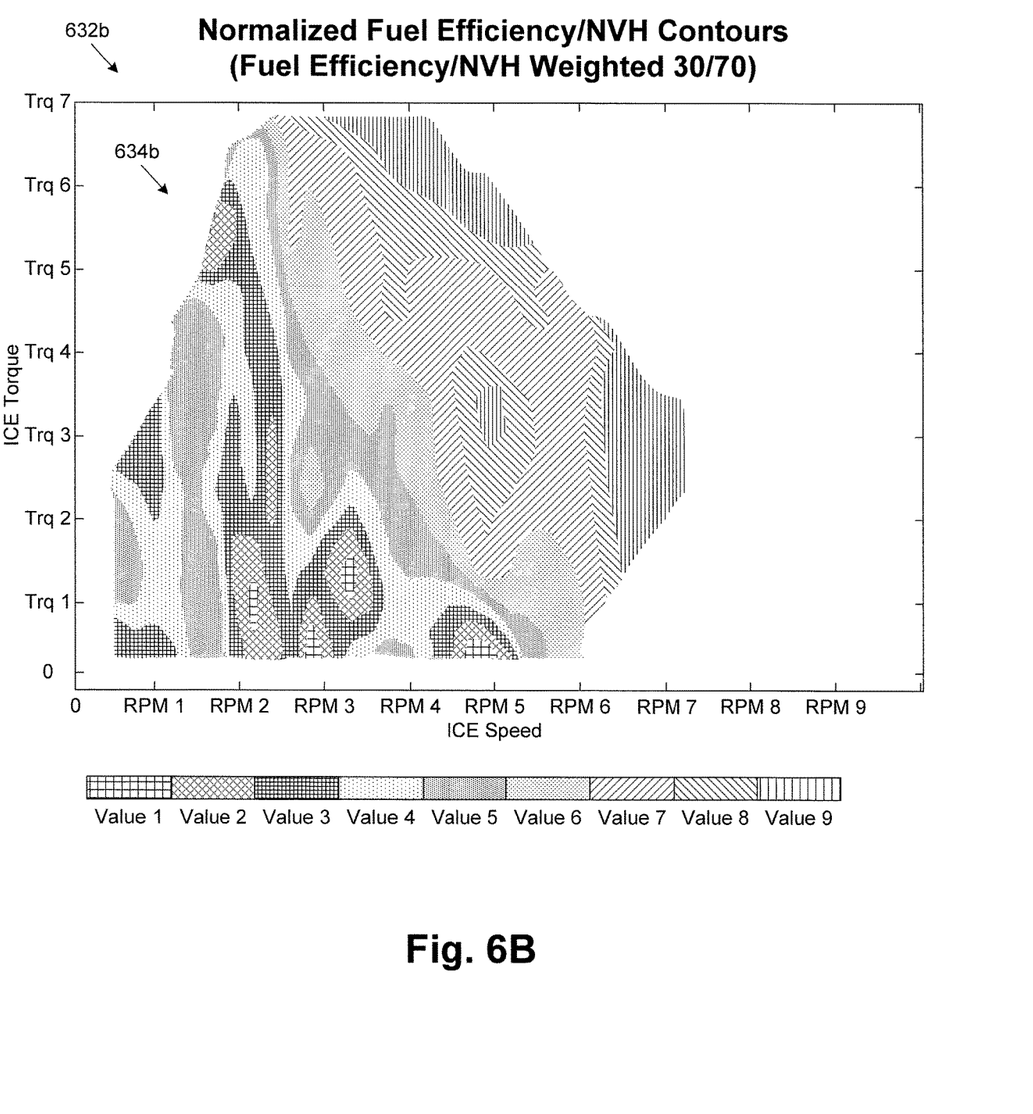

FIGS. 6A and 6B each illustrate a portion of an exemplary normalized fuel efficiency and NVH level map according to one implementation of the present application. As illustrated in FIG. 6A, exemplary normalized fuel efficiency and NVH level map 632a includes normalized fuel efficiency/NVH level contours 634a. A normalized fuel efficiency/NVH level contour represents both fuel efficiency and NVH level. For example, normalized fuel efficiency/NVH level contours 634a may represent products of fuel efficiency contours 234 in FIG. 2B and NVH level lines 334 in FIG. 3B after normalization. Likewise, as illustrated in FIG. 6B, exemplary normalized fuel efficiency and NVH level map 632b includes normalized fuel efficiency/NVH level contours 634b, and normalized fuel efficiency/NVH level contours 634b may represent products of fuel efficiency contours 234 in FIG. 2B and NVH level lines 334 in FIG. 3B after normalization. Normalized contour values may include a product of BSFC and dB. Lower values correspond to better fuel economy and lower NVH levels of ICE 120 in FIG. 1. Measurement unit & map generator 116 produces normalized fuel efficiency/NVH level contours 634a and 634b shown in normalized fuel efficiency and NVH level maps 632a and 632b based on numerous measured values, as discussed above. In FIGS. 6A and 6B, each normalized fuel efficiency/NVH level contour's region is shown by a unique cross-hatching in addition to being identified by a corresponding value.

Normalized fuel efficiency and NVH level maps 632a and 632b in FIGS. 6A and 6B show normalized fuel efficiency/NVH level contours 634a and 634b with values of Value 1 up to Value 9. Values shown in FIGS. 6A and 6B are merely examples and are not intended to correspond to actual numerical values. In some implementations, Normalized fuel efficiency and NVH level maps 632a and 632b may have normalized fuel efficiency/NVH level contours 634a and 634b with different ranges and increments. The shapes of normalized fuel efficiency/NVH level contours 634a and 634b will generally vary between different vehicles and weighting factors. In one implementation, normalized contours may be adapted to normalize and include emissions measurements, in addition to both fuel efficiencies and NVH levels.

As illustrated in FIGS. 6A and 6B, measurement unit & map generator 116 produces by using normalized fuel efficiency/NVH level contours 634a and 634b by assigning different weighting factors to fuel efficiency and NVH levels. In the implementation shown in FIG. 6A, measurement unit & map generator 116 assigns fuel efficiency a weighting factor of 70%, and assigns NVH level a weighting factor of 30%. In the implementation shown in FIG. 6B, measurement unit & map generator 116 assigns fuel efficiency a weighting factor of 30%, and assigns NVH level a weighting factor of 70%. Notably, each normalized fuel efficiency/NVH level contour's region is different between the implementations of FIGS. 6A and 6B. In various implementations, weighting factors other than 70% and 30% may be used. In one implementation, measurement unit & map generator 116 assigns weighting factors based on user input. In one implementation, measurement unit & map generator 116 may assign incremental weighting factors and produce normalized fuel efficiency and NVH level maps for every weighting factor. In one implementation, weighting factors can be assigned to emissions measurements, in addition to both fuel efficiencies and NVH levels.

By assigning weighting factors to normalized fuel efficiency/NVH level contours 634a and 634b, as discussed below, measurement unit & map generator 116 produces efficiency maps with different desirable torques and/or a desirable RPMs for ICE 120 in FIG. 1 based on the assigned weighting factors. Thus, ICE 120 can be run efficiently while allowing prioritization or leniency with respect to fuel efficiency, NVH levels, emission outputs, etc.

Figure 7A:
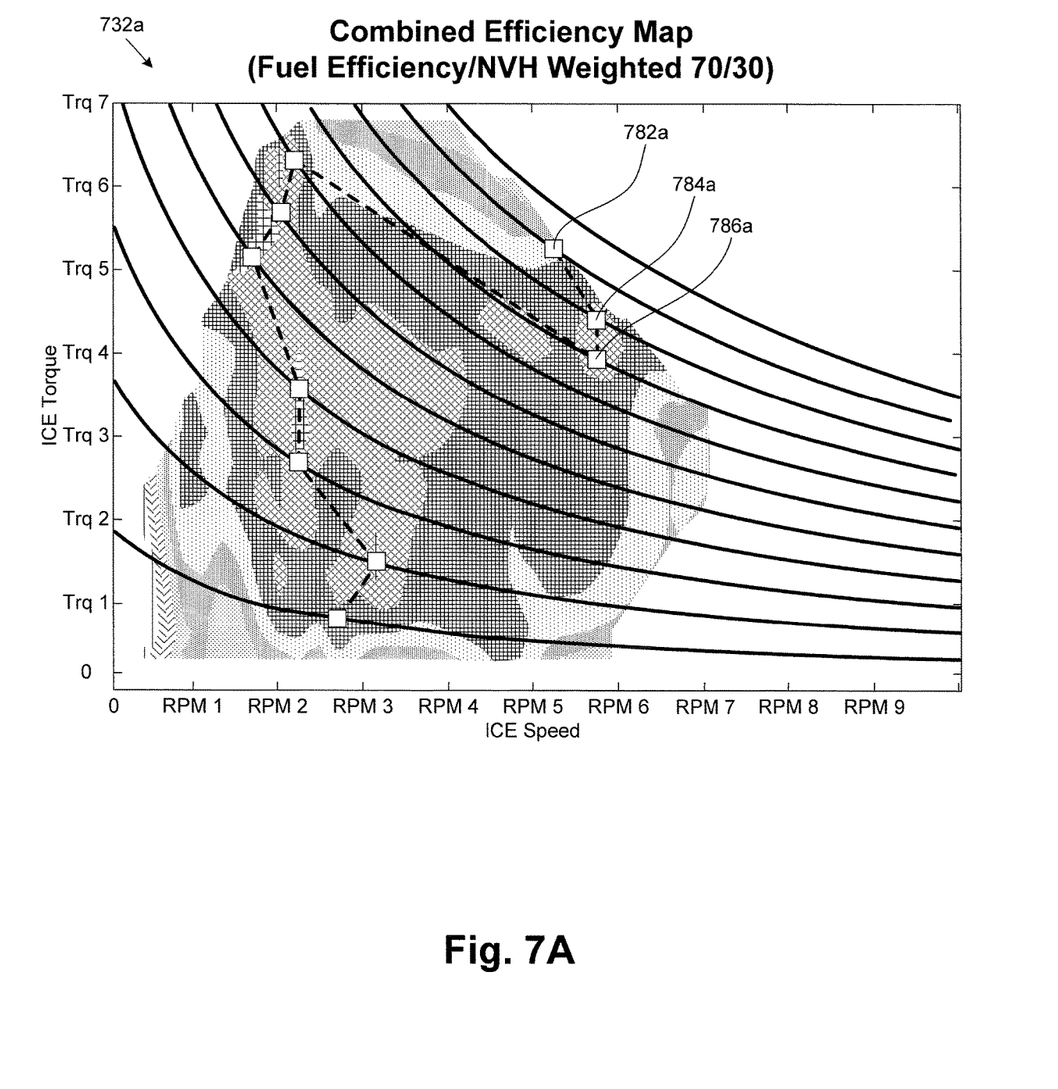
FIGS. 7A and 7B each illustrate a portion of an exemplary combined efficiency map according to one implementation of the present application.
Figure 7B:
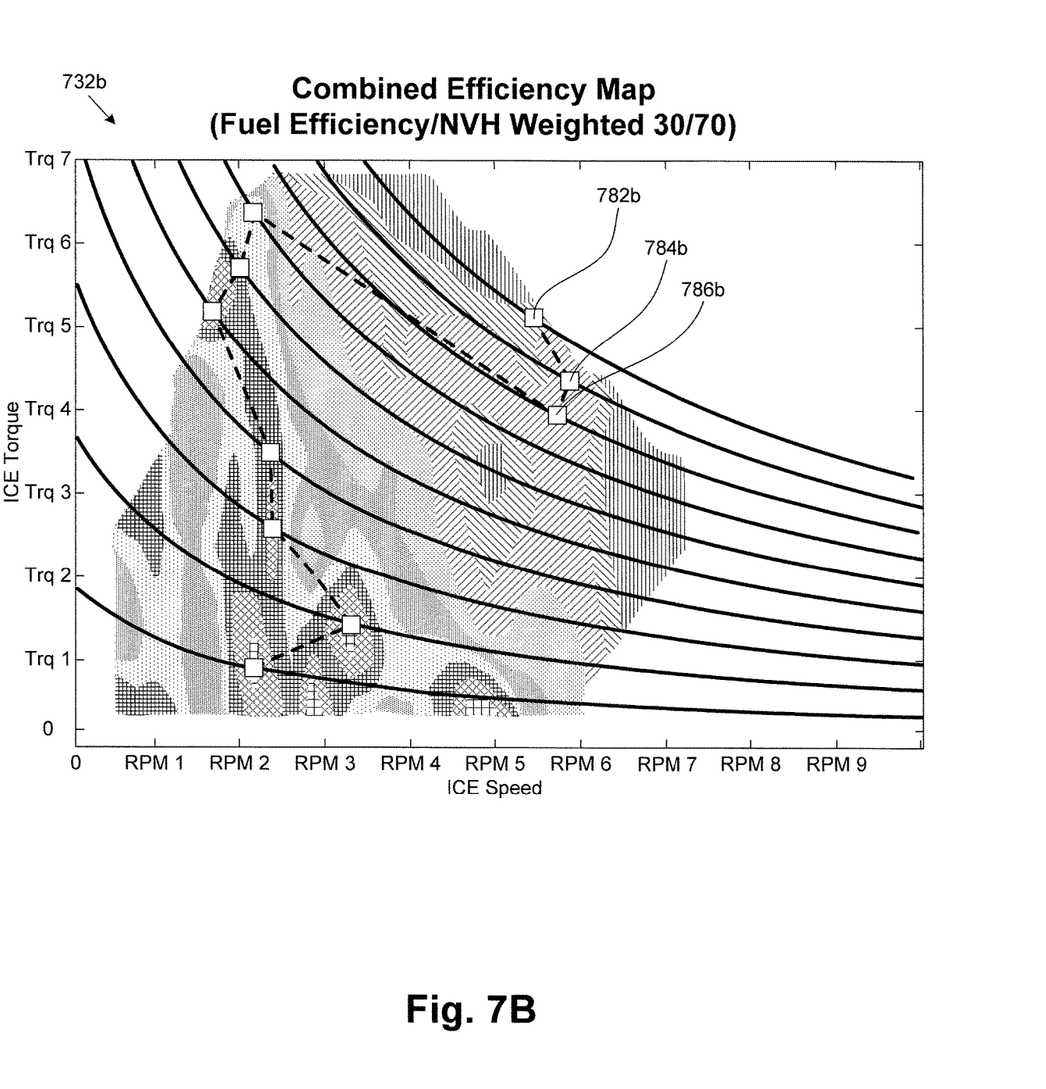

FIGS. 7A and 7B each illustrate a portion of an exemplary combined efficiency map according to one implementation of the present application. As illustrated in FIG. 7A, combined efficiency map 732a includes normalized fuel efficiency/NVH level contours 634a and power level curves 434 by combining and incorporating normalized fuel efficiency and NVH level map 632a and power level efficiency map 432. Likewise, as illustrated in FIG. 7B, combined efficiency map 732b includes normalized fuel efficiency/NVH level contours 634b and power level curves 434 by combining and incorporating normalized fuel efficiency and NVH level map 632b and power level efficiency map 432. Efficiency maps 732a and 732b further include vehicle operation points, indicated visually as squares, such as squares or vehicle operation points 782a, 784a, and 786a, and 782b, 784b, and 786b respectively connected by dashed lines. Vehicle operation points of efficiency maps 732a and 732b represent desirable torques and/or a desirable RPMs for ICE 120 in FIG. 1. That is, when ICE 120 in FIG. 1 is run at a vehicle operation point, vehicle 118 will exhibit an acceptable NVH level and/or a desired fuel efficiency.

Unlike in the implementation shown in FIG. 5D, in the implementations shown in FIGS. 7A and 7B, measurement unit & map generator 116 uses normalized fuel efficiency/NVH level contours and weighting factors. A desirable torque and a desirable RPM for ICE 120 in FIG. 1 can otherwise be determined by measurement unit & map generator 116 according to any manner described above.

Thus, ICE 120 can be run efficiently while allowing prioritization or leniency with respect to fuel efficiency, NVH levels, emission outputs, etc.

By assigning weighting factors to normalized fuel efficiency/NVH level contours 634a and 634b, measurement unit & map generator 116 produces efficiency maps 732a and 732b with different desirable torques and/or a desirable RPMs for ICE 120 in FIG. 1 based on the assigned weighting factors. For example, in FIG. 7A, where fuel efficiency is assigned a weighting factor of 70% and NVH level is assigned a weighting factor of 30%, the first vehicle operation point along the lowest power level curve lies approximately at RPM 3 and slightly below Trq 1. In FIG. 7B, where fuel efficiency is assigned a weighting factor of 30% and NVH level is assigned a weighting factor of 70%, the first vehicle operation point along the lowest power level curve is shifted up compared to FIG. 7A, and lies approximately at RPM 2 and approximately at Trq 1.

Thus, various implementations of the present application achieve a system for intelligent power management in a vehicle that overcomes the deficiencies in the art by producing an efficiency map including fuel efficiency contours, NVH level lines, and a vehicle operation point. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

The invention claimed is:

1. A system for intelligent power management in a vehicle, said system comprising:
   a fuel efficiency sensor measuring fuel efficiencies of said vehicle, said fuel efficiency sensor including a dynamometer sensing torques and revolutions per minute (RPMs) of an internal combustion engine (ICE);
   a noise, vibration, and/or harshness (NVH) sensor measuring NVH levels of said vehicle;
   a measurement unit and map generator producing an efficiency map including a plurality of fuel efficiency contours representing said fuel efficiencies of said vehicle, a plurality of NVH level lines representing said NVH levels of said vehicle, and a plurality of power level curves representing power levels of said ICE;
   wherein said efficiency map includes at least one vehicle operation point that corresponds to an acceptable NVH level and/or a desirable fuel efficiency, wherein said at least one vehicle operation point represents a desirable torque and/or a desirable RPM of said ICE.

2. The system of claim 1, wherein said efficiency map further includes a plurality of emission contours, and said at least one vehicle operation point corresponds to a desirable emission output.

3. The system of claim 1, wherein said plurality of fuel efficiency contours are assigned a first weighting factor and said plurality of NVH level lines are assigned a second weighting factor.

4. The system of claim 1, wherein said NVH sensor measures said NVH levels in a passenger cabin of said vehicle.

5. The system of claim 1, wherein said power levels of said ICE are based on said sensed torques and RPMs.

6. The system of claim 1, wherein said NVH sensor comprises a microphone array and an accelerometer.

7. A system for intelligent power management in a vehicle, said system comprising:
   a fuel efficiency sensor measuring fuel efficiencies of said vehicle, said fuel efficiency sensor including a dynamometer sensing torques and revolutions per minute (RPMs) of an internal combustion engine (ICE);
   a noise, vibration, and/or harshness (NVH) sensor measuring NVH levels of said vehicle;
   a measurement unit and map generator producing an efficiency map including a plurality of fuel efficiency contours representing said fuel efficiencies of said vehicle, a plurality of NVH level lines representing said NVH levels of said vehicle, and a plurality of power level curves representing power levels of said ICE.

8. The system of claim 7, wherein said efficiency map includes an intersection region that corresponds to one of said plurality of fuel efficiency contours having a desirable fuel efficiency along one of said plurality of power level curves.

9. The system of claim 8 wherein said efficiency map includes at least one vehicle operation point that corresponds to one of said plurality of NVH level lines having an acceptable NVH level along said intersection region, said at least one vehicle operation point representing a desirable torque and/or a desirable RPM of said ICE.

10. The system of claim 7, wherein said efficiency map further includes a plurality of emission contours.

11. The system of claim 7, wherein said plurality of fuel efficiency contours are assigned a first weighting factor and said plurality of NVH level lines are assigned a second weighting factor.

12. The system of claim 7, wherein said NVH sensor measures said NVH levels in a passenger cabin of said vehicle.

13. The system of claim 7, wherein said power levels of said ICE are based on said sensed torques and RPMs.

14. The system of claim 7, wherein said NVH sensor comprises a microphone array and an accelerometer.

15. A method for intelligent power management in a vehicle, said method comprising:
   sensing torques and revolutions per minute (RPMs) of an internal combustion engine (ICE);
   measuring fuel efficiencies of said vehicle;
   measuring noise, vibration, and/or harshness (NVH) levels of said vehicle;
   producing an efficiency map including a plurality of fuel efficiency contours representing said fuel efficiencies of said vehicle, a plurality of NVH level lines representing said NVH levels of said vehicle, and a plurality of power level curves representing power levels of said ICE;
   wherein said efficiency map includes at least one vehicle operation point that corresponds to an acceptable NVH level and a desirable fuel efficiency, wherein said at least one vehicle operation point represents a desirable torque and/or a desirable RPM of said ICE.

16. The method of claim 15, wherein said efficiency map further includes a plurality of emission contours, and said at least one vehicle operation point corresponds to a desirable emission output.

17. The method of claim 15, wherein said plurality of fuel efficiency contours are assigned a first weighting factor and said plurality of NVH level lines are assigned a second weighting factor.

18. The method of claim 15, wherein said efficiency map includes products of said plurality of fuel efficiency contours and said plurality of NVH level lines after normalization.

19. The method of claim 15, wherein said NVH levels are measured in a passenger cabin of said vehicle.

20. The method of claim 15, wherein said power levels of said ICE are based on said sensed torques and RPMs.

* * * * *